United States Patent [19]

Sijbrandij

[11] Patent Number: 4,470,499
[45] Date of Patent: Sep. 11, 1984

[54] DEVICE FOR ATTACHING A SIDE GUIDE OF A CONVEYOR DEVICE TO A STRUT

[75] Inventor: George Sijbrandij, Poeldijk, Netherlands

[73] Assignee: M.C.C. Nederland B.V., Gravenzande, Netherlands

[21] Appl. No.: 367,027

[22] Filed: Apr. 9, 1982

[30] Foreign Application Priority Data

Apr. 24, 1982 [DE] Fed. Rep. of Germany ....... 3116334

[51] Int. Cl.³ .............................................. B65G 21/20
[52] U.S. Cl. .................................... 198/836; 403/312
[58] Field of Search ............. 24/250, 243 B; 198/836; 248/231.2; 403/310, 311, 312

[56] References Cited

U.S. PATENT DOCUMENTS

| 760,621 | 5/1904 | Guy | 403/312 |
| 1,777,654 | 10/1930 | Saviano | 198/836 |
| 1,806,687 | 5/1931 | Hoover | 403/312 |
| 3,280,962 | 10/1966 | Stone et al. | 198/836 |
| 3,528,164 | 9/1970 | Packman et al. | 403/312 |
| 3,788,457 | 1/1974 | Valentino, Jr. | 198/836 |
| 3,800,938 | 4/1974 | Stone | 198/836 |

FOREIGN PATENT DOCUMENTS 48524 9/1980 European Pat. Off. .
2439804 3/1976 Fed. Rep. of Germany ...... 198/836

Primary Examiner—Jeffrey V. Nase
Assistant Examiner—Jon M. Rastello
Attorney, Agent, or Firm—Larson and Taylor

[57] ABSTRACT

A conveyor web, that in cross-section is shown in FIG. 1 is by means of an edge (2) supported on a longitudinal support member (3). A metal profile (20) with a profiled guide (22) is clamped to the longitudinal support member (3) by means of a mounting pin (7), a mounting pin (7) protruding through an eyelet (9) which is screwed in a threaded turn knob, which fulfills the task of counter thread member.

5 Claims, 3 Drawing Figures

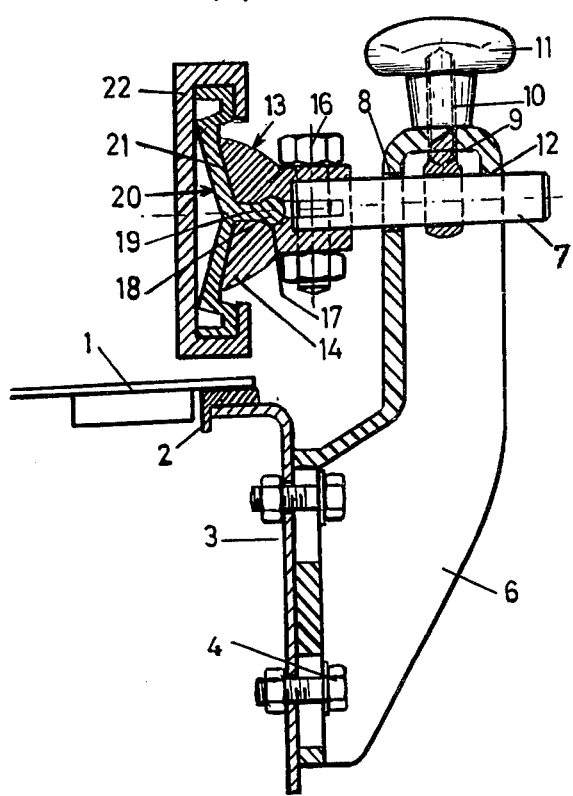
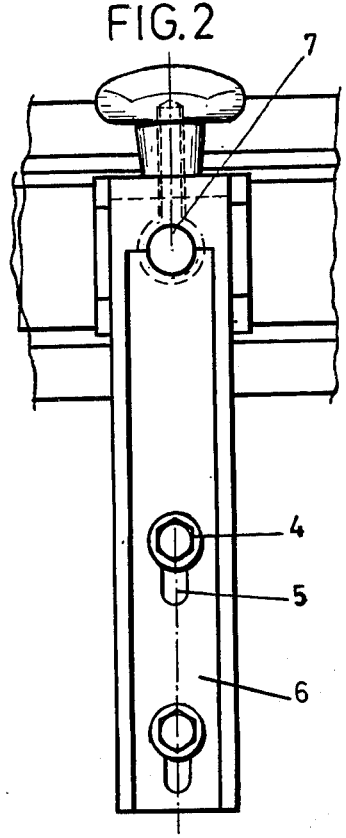
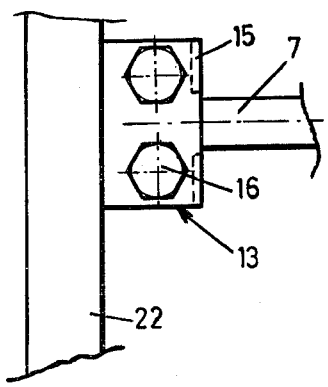

DEVICE FOR ATTACHING A SIDE GUIDE OF A CONVEYOR DEVICE TO A STRUT

The invention relates to a conveyor device that is specially suited for bottles and such like, in which the object to be transported are located on a mainly horizontally moved conveyor surface and side guides keep the object on this surface.

In many instances these side guides are formed of a continuous plastic profile that is supported by a metal profile. Then the metal profile is connected to a mounting pin, which mounting pin is shiftably and fixably applied in a strut in such a way, that a side guide can be mounted in a predetermined form. A curved form for instance is required in curves of this side guide. These curves for instance are necessary for shifting the objects from the moving surface to the side or onto a second conveyor surface moving along the said moving surface.

The connection between the metal profile and the mounting pin can be obtained by means of a bolt passing through a hole in the metal profile and being for instance threaded in a threaded hole in the mounting pin.

Therewith a difficulty is, that in the metal profile holes have to be applied and well in each location where a connection with a mounting pin is required. In case afterwards the application of a further support of the side guide proves to be necessary, as for instance in a curve for that purpose the plastic profile has to be removed from the metal profile, or one has to use two separate plastic profiles mounted over each other, which, however, leads to a less attractive sight and more locations where filthyness may occur.

Further each mounting pin has to be provided with a threaded hole and for threading the screw into the threaded hole an at least partly non cylindrical shape of the mounting pin is desired.

The invention aims to eliminate these difficulties and to procure a device for attaching a side guide to a strut, which can easily be used without the need of applying holes in the metal profile. Consequently the flexibility of the conveyor devic for different types of objects is very essentially improved or another use of the device is considerably facilitated, because the location of the different struts has not to be determined beforehand, so that special personnel are not further necessary for a switch.

According to the invention it is provided that the device for attaching a side guide to a mounting pin applied in a strut in a conveyor device is formed by a clamping device having essentially two parts, the parts of the clamping device at the one hand encompass a rib of the metal profile extending in the longitudinal direction of the metal profile and in a plane transverse to the guiding surface and at the other hand the mounting which clamping parts by means of bolts or such like are pressed toward each other.

With an exemplary embodiment of the invention the clamping parts are pressed toward each other by means of two bolts which are located at both sides of the longitudinal axis of the mounting pin.

Preferably the clamping parts are made of a somewhat yielding plastic material and at the end away from the metal profile by means of an unitary member are connected with each other. In this way a clamping device that is ready for use is always at hand and the application of the clamping device is facilitated.

A further advantageous embodiment of the invention is characterized in that the rib of the metal profile at the end encompassed by the clamping device is provided with an enlargement, which enlargement is received in recesses correspondingly formed in the clamping parts. In this way also forces directed away from the strut and working on the side guide can easily be absorbed by the attaching device.

Therewith it is preferred that the mainly vertical surfaces of the metal profile that join the surfaces of the rib are applied in such a way, that each of these surfaces includes with the related surface of the rib an angle of over 90°, whereas the clamping parts are provided with corresponding surfaces lying against the mainly vertical surfaces.

In this manner with the clamping of the clamping parts by means of the enlargement, a good contact of the clamping device with the mainly vertical surfaces of the metal profile and also a perfect support thereof are obtained.

The inventive innovation in the following is further described on hand of the exemplary embodiment shown in the drawing.

Herein show:

FIG. 1 a vertical cross-section through an exemplary embodiment of the attaching device together with the strut and the side guide, FIG. 2 a front view of the device shown in FIG. 1 and FIG. 3 a plan view, partly in section, of certain parts of the device shown in FIG. 1.

In FIG. 1 a conveyor web moving perpendicular to the plane of drawing has been indicated with reference 1, on the upper side of which not specially shown objects for instance bottles are present. An edge 2 of for instance plastic material supporting the conveyor web 1 is mounted to a longitudinal support 3. By means of threaded bolts 4 and oblong holes 5 a strut 6 is attached to the longitudinal support 3. A mounting pin 7, which preferably has a circular cross-section, protrudes through a hole 8 in the strut 6 and an eyelet 9 of a threaded bolt 10 supports a threaded turn knob 11 that serves the purpose of the counter thread and pulls the mounting pin 7 against the edge of the hole 8 and the circular recess 12 of the strut 6 and therewith clamps it.

At its left end, the mounting pin 7 is received in a clamping device 13. This clamping device is formed by two parts 14 connected to each other by means of transverse members 15. Because the device 13 is made from a plastic material that yields a little, the parts 14 can be pressed towards each other by means of threaded bolts 16, wherewith the members 15 can be deformed somewhat.

The clamping parts 14 are each provided with a recess 17, in which recesses 17 an enlargement of the rib 19 of the metal profile 20 can be received.

The metal profile 20 has, starting from the rib 19, walls 21 that tilt a little and cooperate in such a way with the clamping parts 14 that during the clamping of the parts 14 the walls 21 of the metal profile 20 by means of the enlargement 18 are pressed against the clamping parts 14 and a perfect support of the metal profile 20 is reached.

The metal profile 20 is further shaped in such a way that it can support the side guide proper, for instance the profile 22 of plastic material.

What I claim is:

1. In a conveyor; a framework for supporting the conveyor, a side guide for guiding articles on said conveyor, a metal profile mounted to the side guide and extending in the longitudinal direction of the side guide and including a rib extending in a plane transverse to said longitudinal direction, a mounting pin supported by said framework and extending in said plane towards the rib and means for clamping said rib and said mounting pin together; said clamping means comprising two parts, said parts encompassing said rib and said mounting pin, and pressing means for pressing said parts towards each other against opposing sides of said rib and said mounting pin.

2. In a conveyor according to claim 1, in which said pressing means comprises two bolts which are located at both sides of the longitudinal axis of the mounting pin.

3. Device according to claim 2, in which the clamping parts (14) are made of a somewhat yielding plastic material and at the end away from the metal profile (20) by means of an unitary member (15) are connected with each other.

4. Device according to claim 1, in which the rib (19) of the metal profile (20) at the end encompassed by the clamping device (13) is provided with and enlargement (18), which enlargement (18) is received in recessed in recesses (17) correspondingly formed in the clamping parts.

5. Device according to claim 4, in which mainly vertical surfaces of a wall (21) of the metal profile (20) join the surfaces of the rib (19) and include an angle of over 90° with them, the surfaces of the clamping parts being correspondingly matched.

* * * * *